(12) United States Patent
Suchak

(10) Patent No.: US 8,734,741 B1
(45) Date of Patent: May 27, 2014

(54) METHODS FOR REMOVING CONTAMINANTS FROM EXHAUST GASES

(71) Applicant: Naresh J. Suchak, Glen Rock, NJ (US)

(72) Inventor: Naresh J. Suchak, Glen Rock, NJ (US)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 13/870,366

(22) Filed: Apr. 25, 2013

Related U.S. Application Data

(60) Provisional application No. 61/640,128, filed on Apr. 30, 2012.

(51) Int. Cl.
| | | |
|---|---|---|
| *B01D 47/00* | (2006.01) | |
| *B01D 53/34* | (2006.01) | |
| *B01D 53/40* | (2006.01) | |
| *B01D 53/50* | (2006.01) | |
| *B01D 53/56* | (2006.01) | |
| *B01D 53/64* | (2006.01) | |

(52) U.S. Cl.
USPC . 423/210; 423/235; 423/243.01; 423/243.08; 423/215.5

(58) Field of Classification Search
USPC ............. 423/210, 235, 243.01, 243.08, 215.5
See application file for complete search history.

(56) References Cited

U.S. PATENT DOCUMENTS

| 5,206,002 | A | 4/1993 | Skelley et al. |
| 7,303,735 | B2 | 12/2007 | Suchak et al. |
| 7,766,995 | B2 | 8/2010 | Suchak et al. |
| 2007/0128090 | A1 | 6/2007 | Ray et al. |

FOREIGN PATENT DOCUMENTS

| CN | 101 822 937 A | 9/2010 | |
| GB | 1 229 107 A | 4/1971 | |
| JP | 62-213825 A | * 9/1987 | .................... 423/235 |
| JP | 11 090151 A | 4/1999 | |
| JP | 2008 073642 A | 4/2008 | |
| WO | WO 2005/014134 A2 | 2/2005 | |

* cited by examiner

*Primary Examiner* — Timothy Vanoy
(74) *Attorney, Agent, or Firm* — Philip H. Von Neida

(57) ABSTRACT

A method for removing contaminants from a gas stream by feeding the gas stream into a scrubber that can use seawater as the scrubbing medium. The gas stream is first scrubbed with the seawater and then mixed with ozone to remove the contaminants. Nitrogen oxides that are present in the gas stream are converted to nitric acid/nitrates and these are recovered via condensate or coalesced mist for neutralization. The treated gas stream is then exhausted to the atmosphere.

28 Claims, 2 Drawing Sheets

METHODS FOR REMOVING CONTAMINANTS FROM EXHAUST GASES

CROSS REFERENCE TO RELATED APPLICATIONS

This application claims priority from U.S. provisional application Ser. No. 61/640,128, filed Apr. 20, 2012.

BACKGROUND OF THE INVENTION

The invention provides for methods for removing contaminants selected from the group consisting of nitrogen oxides, sulfur oxides, particulates, heavy metals and acid gases from gas streams. More particularly, the invention provides for the removal of contaminants from gas streams arising from engines and other combustion devices on board ships and on land where seawater is used for scrubbing of the combustion gas streams.

The invention can also treat exhaust gas streams from chemical, metallurgical, partial and full combustion processes by the removal of contaminants such as nitrogen oxide, sulfur oxides, hydrochloric acid and particulate materials when co-scrubbing of nitrogen oxides would generate nitrates that are objectionable by-products.

The nitrogen oxides captured are separated from the other contaminants in the gas stream. This produces a smaller quantity of nitrate-containing liquid stream that needs to be processed before it can be discharged or re-used.

Combustion and chemical processes generally result in gas streams containing contaminants that need to be cleaned up before the gas stream is exhausted to the atmosphere.

Large ocean freighters, ferries, ocean liners and navy vessels use low cost hydrocarbon fuels that contain sulphur, chlorine, nitrogen and metal compounds in hydrocarbons which results in exhaust gases with contaminants such as acid gases, particulate matter and heavy metals. As per new legislative mandates, these large emitters need to clean up the flue gas stream before exhausting it to the atmosphere. Amongst many technologies and devices, aqueous scrubbing using seawater is one of the more widely used techniques to remove acid gases such as sulfur oxides, chlorine, hydrochloric acid, etc., particulates and other contaminants. Seawater is mildly alkaline and generally used in once through mode to neutralize the acidic components present in the seawater to form salts that are permitted to be discharged back to the ocean in an environmentally safe manner.

Many industrial installations using wet scrubbers such as fluid catalytic cracker regenerators and electrical generation along the sea coast use seawater for scrubbing in a once through or recycle mode.

In combustion processes, in addition to sulfur oxides, hydrochloric acid, chlorine and other acid gases, nitrogen oxides are also formed due to a number of reasons such as high flame temperature (thermal $NO_x$), nitrogenous compounds present in the fuel (fuel $NO_x$) or nitrogenous content of material subjected to combustion temperatures such as incineration of waste.

Nitrogen oxides formed at temperatures above 1300° F. (~704° C.) are mainly in the form of nitric oxide, NO. Nitric oxide is the major component of nitrogen oxides in combustion processes. Nitric oxide is almost insoluble in water so aqueous scrubbing removes negligible amounts of nitric oxide from nitrogen oxide streams. Coal, solid fuels, heavy oils and other carbon feed stocks when combusted form exhaust gas streams that contain particulate matter and other objectionable contaminants such as heavy metals like mercury which may or may not be effectively scrubbed by aqueous scrubbing operations.

Amongst all absorption processes, ozone-based processes as described in U.S. Pat. Nos. 6,162,409; 5,206,002; and 7,303,735 provide multi-pollutant removal approaches and have been implemented on flue gas arising from gas and coal fired boilers for removal of multiple pollutants including nitrogen oxides, sulfur oxides, particulates, etc. Ozone-based processes are also industrially practiced in lowering emissions in metal pickling processes, fluidized catalytic cracker (FCC) regenerators, and metal recovery furnaces.

The method as disclosed in U.S. Pat. Nos. 6,162,409; 5,206,002; 6,649,132 and 7,303,735 uses the chemistry of nitrogen oxide reaction with ozone to form higher oxides of nitrogen, especially the pentavalent form or higher. These oxides are very soluble in water and are easily removed by wet scrubbing. The stoichiometric amount of ozone required to convert one mole of nitrogen oxides in the form of NO to the pentavalent form is about 1.5 moles of ozone. This number is reduced to 0.5 moles of ozone if the nitrogen oxides are in the form of $NO_2$.

Although the methods described in these patents are effective at achieving low levels of nitrogen oxides emissions in the treated gas stream, they generate nitrate/nitric acid in the scrubber purge. The nitrate/nitric acid needs to be treated and disposed of in an environmentally safe way or must be utilized in making a useful by-product. This all adds to the expense of treating for the nitrogen oxides.

When seawater is used as a scrubbing medium, it is used in a once through mode due to its limited alkalinity. This generates a large quantity of liquid discharge from the wet scrubber. When ozone is added for nitrogen oxides removal, the purge stream will contain nitrates which will require treatment before discharge back to the sea.

The invention is able to overcome the problems that earlier methods have experienced. Contamination of scrubber purge with nitrate is mitigated so that a large quantity of seawater can be used in a once through scrubbing medium that can be safely discharged without additional treatments. A separate scrubber for nitrogen oxides removal is also not necessary thereby minimizing capital investment in retrofitting acid gas (sulfur oxides, hydrochloric acid, etc.) or particulate scrubbing equipment with nitrogen oxides control.

SUMMARY OF THE INVENTION

In one embodiment of the invention, there is disclosed a method for removing contaminants from a gas stream comprising the steps of:
a) Feeding the gas stream containing contaminants into a scrubber;
b) Contacting the gas stream containing contaminants with a scrubbing medium comprising seawater;
c) Contacting the gas stream containing contaminants with ozone; and
d) Recovering a gas stream free of contaminants.

In another embodiment of the invention, there is disclosed a method for removing contaminants from a gas stream comprising the steps of:
a) Feeding the gas stream containing contaminants into a scrubber;
b) Contacting the gas stream containing contaminants with a scrubbing medium comprising seawater;
c) Feeding the gas stream containing contaminants to a droplet separator in fluid communication with the scrubber;

d) Contacting the gas stream containing contaminants with ozone; and
e) Recovering a gas stream free of contaminants.

The gas stream that is treated is typically a flue gas stream from a combustion or chemical process. Typically too these flue gas streams are from onboard ship processes or from operations that are near the ocean where seawater is plentiful. These flue gas streams typically contain contaminants selected from the group consisting of particulates, sulfur oxides, nitrogen oxides, acid gases and heavy metals such as mercury.

The contaminants, particularly the sulfur oxides and the nitrogen oxides will react when contacted with the ozone. These reactions will also produce byproducts such as nitrates and nitric acid which may be recovered for additional operational uses or they may be treated and disposed of in preferably an environmentally responsible manner.

The scrubber is typically selected from the group consisting of spray type, venturi type, rod, packed bed and plate column scrubbers. The scrubber employed in the methods of the invention should be of sufficient size to allow for the ozone to mix with the gas stream and remain in contact with the contaminants for a sufficient enough time to oxidize the contaminants.

The ozone will be added in an amount of greater stoichiometry than the amount of nitrogen oxides present in the gas stream.

The gas stream containing the oxidized nitrogen oxides can contact a droplet separator where nitric acid that is present in the treated gas stream will condense and can be captured in the liquid state.

The scrubber may further include a device selected from the group consisting of a cooling coil, a mist eliminator and an electro static precipitator (ESP). These devices can be used to help condense certain of the reaction products of the reaction between the contaminants and the ozone that will be present in the gas stream as it rises through the scrubber. These condensed reaction products can be recovered and recycled or treated for disposal.

The seawater is preferably fed to the scrubber through a system of one or more distributors so that the seawater more freely contacts that gas stream containing the contaminants to be treated. The seawater may be fed continuously into the scrubber or it may be used on a recycle basis depending upon the needs of the operator.

DETAILED DESCRIPTION OF THE INVENTION

Figure 1:
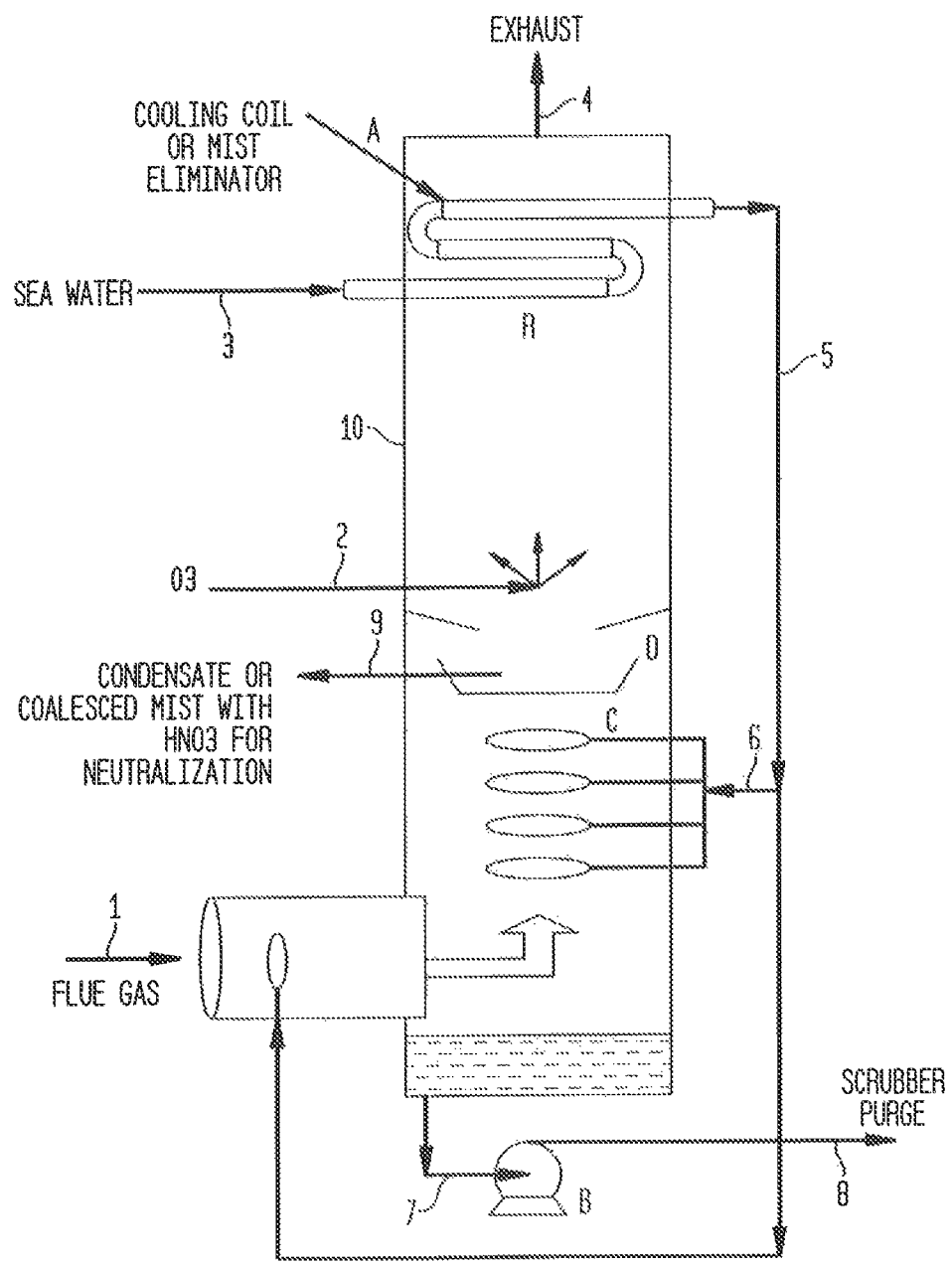
FIG. 1 is a schematic of a scrubber incorporating ozone addition to the flue gas stream.

Flue gas is quenched and scrubbed by seawater in a wet scrubbing device which could be a standard spray type, venturi type, rod, packed bed, plate column or other scrubber commonly used in industrial operations for acid gas and particulate clean up. Wet scrubbers such as EDV scrubber by Belco Technologies or Dynawave by MECS could be employed in the invention. These scrubbers remove particulates, sulfur oxides, hydrochloric acid and other contaminants that are removed by a wet scrubber.

Ozone is then added to the scrubbed gas stream. The oxidation of the nitrogen oxides is accomplished by mixing ozone with the scrubbed gas stream and providing adequate reaction time as described in U.S. Pat. Nos. 7,303,735 and 7,766,995. Proper oxidation of the nitrogen oxides in the presence of moisture will result in the formation of nitric acid which is miscible with water.

The flue gas containing the oxidized nitrogen oxides is then subjected to a droplet separator to lower the carry-over mist or to a controlled cooling on the condensing surface. The droplets in the separator and/or on the condensing surface provide adequate surface area to dissolve, condense, absorb and remove nitrogen oxides.

The droplets are collected to form a small aqueous stream in the droplet separator/condenser and removed and if required neutralized and handled for safe discharge or by product use.

The flue gas stream to be treated contains nitrogen oxides. When ozone is mixed with this stream, the nitrogen oxides are oxidized. If all the nitrogen oxides are in the form of nitric oxide, stoichiometric amounts of ozone required to convert the nitric oxide to dinitrogen pentoxide is 1.5 moles of ozone per mole of nitrogen oxide. For every mole of $NO_2$, only 0.5 moles of ozone are required. Accordingly, a range of about 0.5 to 1.5 moles of ozone per mole of nitrogen oxides can be added to the flue gas stream to be treated. The nitrogen oxide oxidation to dinitrogen pentoxide involve many reactions but for sake of brevity these reactions can be simplified as follows:

$$NO + O_3 \rightarrow NO_2 + O_2 \tag{1}$$

$$NO_2 + O_3 \rightarrow NO_3 + O_2 \tag{2}$$

$$NO_2 + NO_3 \rightarrow N_2O_5 \tag{3}$$

The reaction (1) is an order of magnitude faster compared to reaction (2). Reactions (1), (2) and (3) are somewhat consecutive reactions. $NO_2$ has finite solubility so unless the reaction is brought forward to form oxides higher than $NO_2$ removal of nitrogen oxides in a wet scrubber is limited. In order to form higher oxides without adding excess ozone, it is essential to mix ozone well and provide the necessary reaction time while minimizing back mixing. In order to achieve good nitrogen oxides removal, a number of principles can be applied. The ozone for example can be introduced in the gas phase by a distributor which uniformly distributes ozone in the entire cross section of the flue gas flow. The flow path can be selected for mixing oxygen where the gas flow is turbulent. The velocity of the ozone containing gas stream's injection into the flue gas can be maintained at least two times and preferably three times or more than the flow velocity of the flue gas stream.

Modern tools such as Computational Fluid Dynamic (CFD) modeling can be employed to ensure through mixing of ozone in the flue gas stream in minimum time.

Conical or diverging nozzles in the distributor can quickly disperse ozone into the cross section of the flowing flue gas stream. Ozone can be mixed with large quantities of a diluent gas and introduced into the distributor for mixing with the gas stream containing the nitrogen oxides. The ozone too may be introduced in a co-current or counter-current direction.

When oxidized, the nitrogen oxides are transformed into their pentavalent form. The gas stream exiting the nitrogen oxides treatment zone is saturated with vapor. The dinitrogen pentoxide will react with the moisture in the gas phase forming nitric acid in the gas phase:

$$N_2O_5 + H_2O \rightarrow 2HNO_3(g) \tag{4}$$

$HNO_3$ (g) being soluble in all proportions with liquid water will instantaneously dissolve in the condensing or coalescing water droplets.

$$HNO_3(g) \rightarrow HNO_3(l) \quad (5)$$

Some $N_2O_5$ since it is extremely soluble will directly dissolve in the condensing or coalescing water droplets $$N_2O_5 + H_2O(l) \rightarrow 2HNO_3(l) \quad (6)$$

If there is alkali or alkaline earth metal hydroxide, carbonates or bicarbonates present in the coalescing droplets, they will neutralize the nitric acid and form nitrates. If it is condensing water vapor, then it will remain as nitric acid. In the instant invention, nitrogen oxides can be removed using ozone in a gas stream without intermingling nitrates/nitric acid with the rest of contaminants without using dual scrubbers.

Turning to FIG. 1, a scrubber assembly is shown. Flue gas which contains contaminants selected from the group consisting of particulates, sulfur oxides, nitrogen oxides and acid gases is fed through line 1 into scrubber assembly 10. The flue gas containing the contaminants will rise through the scrubber assembly 10 first contacting seawater which is first fed through line 3 into a cooling coil or mist eliminator A. The seawater will exit the cooling coil or mist eliminator A through line 5 and be fed down to join with the flue gas as it enters the scrubber assembly 10 through line 1. Line 6 will redirect the seawater through a number of distributors C so that the flue gas will contact the seawater and be quenched by this contact.

The flue gas which has been moistened by the seawater will continue to rise through the scrubber assembly 10 and will contact ozone that is fed through line 2 into the scrubber assembly 10. The ozone will have sufficient space based on the size of the scrubber assembly 10 to react with the nitrogen oxides and sulfur oxides present in the flue gas stream. This will allow for the requisite contact time during which the ozone and nitrogen oxides and sulfur oxides will react. Part of the reaction product will be nitric acid which will condense or coalesce on a tray device D and will be removed from the scrubber assembly 10 through line 9 for neutralization and either reused as may be allowed or disposed of in an environmentally friendly manner.

The treated gas stream will continue to rise through the scrubber assembly 10 and will exit as exhaust through line 4. The seawater which is used as the scrubbing medium in the scrubber assembly 10 can be used as a once through or recycled depending upon the operator's preferences. The used scrubbing agent is captured at the bottom of the scrubbing assembly 10 and can be withdrawn through line 7 with the aid of a pump B and purged from the scrubber assembly 10 through line 8.

Figure 2:
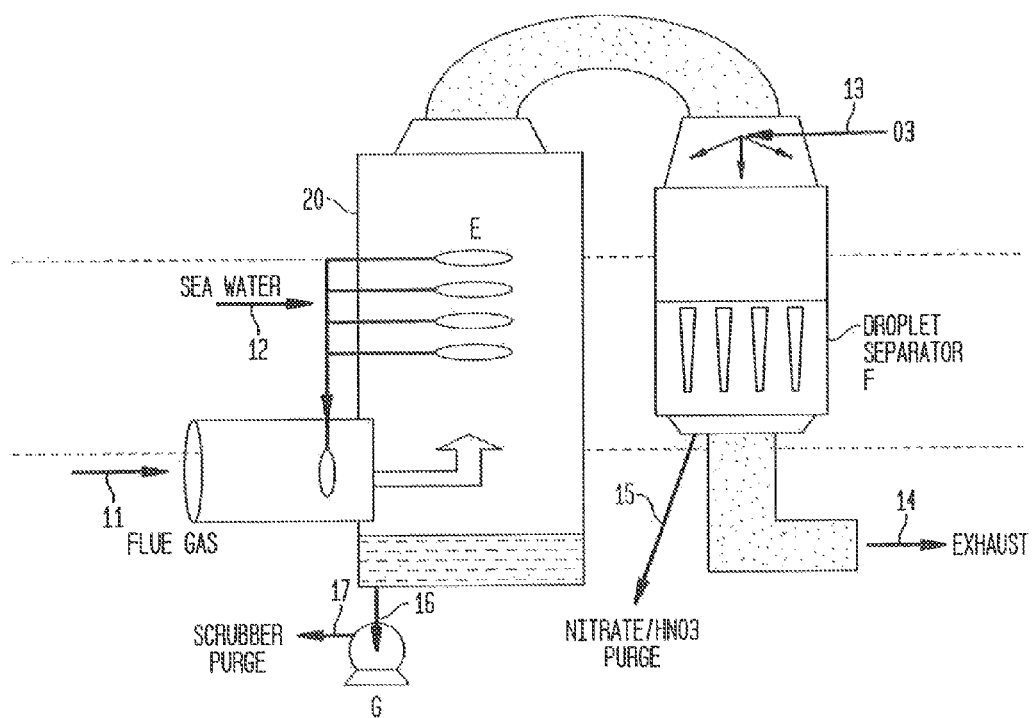
FIG. 2 is a schematic of another scrubber showing the addition of seawater and ozone and nitrate/nitric acid purge recovery.

In a different embodiment of the invention, the ozone adding device is a separate device from the scrubbing assembly. In FIG. 2, scrubbing assembly 20 is attached to a droplet separator F. In the top of the droplet separator F ozone is injected through line 13. Flue gas is fed through line 11 and will rise through the scrubber assembly 20 where it will contact the seawater fed through line 12 to a distribution assembly E. The moist scrubbed flue gas will exit scrubber assembly 20 and enter droplet separator F.

At the top of the droplet separator F the flue gas will contact the ozone where the nitrogen oxides and sulfur oxides present in the flue gas stream will oxidize and their reaction products of nitrates and nitric acid will be collected and purged through line 15. This stream can be treated and neutralized and either used or disposed of in an environmentally friendly manner.

The treated flue gas stream will exit the droplet separator F through line 14 and be evacuated to the atmosphere. The seawater that is employed as the scrubbing medium can be used in a once through manner or be recycled and used for several cycles of treating the flue gas. The used seawater will leave the bottom of the scrubber assembly 20 through line 16 and is assisted in its removal through line 17 by pump G.

Alternatively, a wet electro static precipitator (ESP) can be employed instead of a cooling coil or mist elimination device at the top of the scrubbing assembly shown in FIGS. 1 and 2. The wet ESP condenses the nitric acid/nitrate over plates. Sulfur oxides and acid gas scrubbing are accomplished by quenching or wetting zones of the wet ESP and a small section downstream between the wetting zone and the charged plates is an oxidizer for nitrogen oxides. The seawater used in the wetting zone removes sulfur oxides, hydrochloric acid and other contaminants whereas the charged plates mainly capture the particulates, droplets and nitrogen oxides.

In other embodiments, the invention can employ using an aqueous medium instead of sea water in the wet scrubber with once through or recirculation of aqueous medium through spray nozzles, or flowing through packed, bubble or plate column. The flow of liquid and gas can be counter current or co-current. Spray may be projected to the walls of the scrubbers as is done in the EDV scrubbers.

Mercury or other heavy metals when present in the flue gas are oxidized along with the nitrogen oxides and can also be removed on the condensing/coalescing surfaces along with the nitric acid/nitrate. Using dry adsorbents in a fluidized form or in a fixed bed can be used downstream of the wet scrubber to adsorb moisture and oxidized nitrogen oxides/nitric acid.

The invention oxidizes nitrogen oxides with the addition of ozone downstream of a wet scrubbing stage thereby separating nitrogen oxides removal products such as nitric acid and/or nitrates from the scrubbing of other contaminants present in the gas stream being treated. The scrubbing is preferably performed with seawater such as those industrial installations on sea coasts and aboard ships in a once through mode in the scrubber and where nitrate discharge is to be avoided.

The invention effectively scrubs sulfur oxides, hydrochloric acid and other gases using seawater. A method of oxidizing nitrogen oxides with ozone in the flue gas as described in U.S. Pat. No. 5,206,002. Condensing surfaces, droplet/mist separators or wet electrostatic precipitators (ESPs) to capture oxidized nitrogen oxides are described in U.S. Pat. No. 6,162,409.

The method of the invention eliminates contamination of nitrate/nitric acid in the particulate scrubber or the wet scrubber for acid gas removal but also removes the need for a separate scrubbing device for nitrogen oxides removal and minimizes purge stream containing nitrate/nitric acid that could be neutralized and disposed of in an environmentally responsible manner.

The small stream of liquid that is collected in the droplet separation device or the cooler/condenser with nitric acid can be neutralized, processed and disposed of in an environmentally safe manner or sold/used as a by product.

The separation of other contaminants in the wet scrubber leaves nitrate/nitric acid in a less contaminated form which limits the biological methods that can be used in digesting nitrate/nitric acid to nitrogen.

The invention is not limited to purely sea water scrubbing but could be employed in conjunction with any industrial wet scrubber meant for particulate and/or acid gas scrubbing.

The use of a single wet scrubber that provides for nitrogen oxides removal without intermingling nitrate/nitric acid with other contaminants is less expensive both in terms of capital and operating expenses than prior processes requiring multiple scrubbers.

The volume of nitrate/nitric acid formed by the inventive process is also minimized and the absence of other contaminants in the aqueous effluent stream makes this stream a useful by-product such as a fertilizer. While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what I claim is:

1. A method for removing contaminants from a gas stream comprising the steps of:
   a) feeding the gas stream containing contaminants into a scrubber;
   b) contacting the gas stream containing contaminants with a scrubbing medium comprising seawater;
   c) contacting the gas stream containing contaminants with ozone; and
   d) recovering a gas stream free of contaminants.

2. The method as claimed in claim 1 wherein said gas stream is a flue gas from combustion and chemical processes.

3. The method as claimed in claim 1 wherein the contaminants are selected from the group consisting of particulates, sulfur oxides, nitrogen oxides, acid gases and heavy metals.

4. The method as claimed in claim 1 wherein the contaminants react with the ozone.

5. The method as claimed in claim 1 wherein the scrubber is selected from the group consisting of spray type, venturi type, rod, packed bed and plate column.

6. The method as claimed in claim 1 wherein ozone is mixed with the flue gas stream for a sufficient time for the contaminants to be oxidized.

7. The method as claimed in claim 1 wherein the ozone is fed in an amount of greater stoichiometry than the amount of nitrogen oxides present in the gas stream.

8. The method as claimed in claim 1 wherein the gas stream containing oxidized nitrogen oxides contacts a droplet separator.

9. The method as claimed in claim 1 further comprising a device selected from the group consisting of a cooling coil, mist eliminator and electro static precipitator being present in the scrubber.

10. The method as claimed in claim 1 wherein the seawater is fed into the scrubber through one or more distributors.

11. The method as claimed in claim 1 wherein there is sufficient time for contact between the ozone and the gas stream.

12. The method as claimed in claim 1 wherein nitrates and nitric acid are produced by contacting the gas stream containing contaminants and ozone.

13. The method as claimed in claim 12 wherein the nitrates and nitric acid are recovered and reused or disposed of.

14. The method as claimed in claim 1 wherein the seawater is used on a once through basis or is recycled.

15. A method for removing contaminants from a gas stream comprising the steps of:
   a) feeding the gas stream containing contaminants into a scrubber;
   b) contacting the gas stream containing contaminants with a scrubbing medium comprising seawater;
   c) feeding the gas stream containing contaminants to a droplet separator in fluid communication with the scrubber;
   d) contacting the gas stream containing contaminants with ozone; and
   e) recovering a gas stream free of contaminants.

16. The method as claimed in claim 15 wherein said gas stream is a flue gas from combustion and chemical processes.

17. The method as claimed in claim 15 wherein the contaminants are selected from the group consisting of particulates, sulfur oxides, nitrogen oxides, acid gases and heavy metals.

18. The method as claimed in claim 15 wherein the contaminants react with the ozone.

19. The method as claimed in claim 15 wherein the scrubber is selected from the group consisting of spray type, venturi type, rod, packed bed and plate column.

20. The method as claimed in claim 15 wherein ozone is mixed with the flue gas stream for a sufficient time for the contaminants to be oxidized.

21. The method as claimed in claim 15 wherein the ozone is fed in an amount of greater stoichiometry than the amount of nitrogen oxides present in the gas stream.

22. The method as claimed in claim 15 wherein the gas stream containing oxidized nitrogen oxides contacts a droplet separator.

23. The method as claimed in claim 15 further comprising a device selected from the group consisting of a cooling coil, mist eliminator and electro static precipitator being present in the scrubber.

24. The method as claimed in claim 15 wherein the seawater is fed into the scrubber through one or more distributors.

25. The method as claimed in claim 15 wherein there is sufficient time for contact between the ozone and the gas stream.

26. The method as claimed in claim 15 wherein the seawater is used on a once through basis or is recycled.

27. The method as claimed in claim 15 wherein the ozone is injected into the droplet separator.

28. The method as claimed in claim 15 wherein nitrates and nitric acid are produced by contacting the gas stream containing contaminants and ozone.

* * * * *